United States Patent [19]
Keating

[11] 3,877,359
[45] Apr. 15, 1975

[54] ELECTRIC DEEP FAT FRYER WITH CONTROLLED HEAT DURING START-UP

[76] Inventor: Richard T. Keating, 715 S. 25th Ave., Chicago, Ill. 60104

[22] Filed: Oct. 4, 1974

[21] Appl. No.: 512,130

Related U.S. Application Data

[63] Continuation-in-part of Ser. No. 420,100, Nov. 29, 1973, abandoned.

[52] U.S. Cl. .......... 99/331; 99/337; 99/403; 219/422; 219/425; 219/435; 219/441
[51] Int. Cl. .......................... A47j 37/12
[58] Field of Search ........ 99/325, 331, 337, 403; 219/421, 422, 425, 435, 436, 437, 438, 439, 441, 442, 523

[56] References Cited
UNITED STATES PATENTS

| | | | |
|---|---|---|---|
| 1,281,521 | 10/1918 | Collins | 219/422 |
| 1,623,209 | 4/1927 | Schuster | 219/425 X |
| 2,778,920 | 1/1957 | Pawelka, Jr. | 219/437 |
| 2,805,314 | 9/1957 | Michaelis | 219/437 |
| 2,902,582 | 9/1959 | Pappas | 219/436 X |
| 3,242,849 | 1/1964 | Wells | 99/411 |
| 3,673,385 | 6/1972 | Drugmand et al. | 99/335 |
| 3,720,155 | 3/1973 | Fritzsche | 99/337 |
| 3,792,801 | 2/1974 | Baker | 219/425 X |

FOREIGN PATENTS OR APPLICATIONS

| | | | |
|---|---|---|---|
| 508,189 | 9/1930 | Germany | 219/438 |

Primary Examiner—Volodymyr Y. Mayewsky
Attorney, Agent, or Firm—Rummler & Snow

[57] ABSTRACT

A fat melting electric deep fat fryer having a set of heating elements which are connected in series for low-heat melt so as not to burn the fat during start-up, and which elements are switched over and connected in parallel for high-heat at a regulated temperature suitable for continuous operation of the fat fryer. The switchover from low-heat to high-heat can be either manually-actuated or temperature-actuated at a temperature just above the melting temperature of the fat.

2 Claims, 8 Drawing Figures

PATENTED APR 15 1975    3,877,359

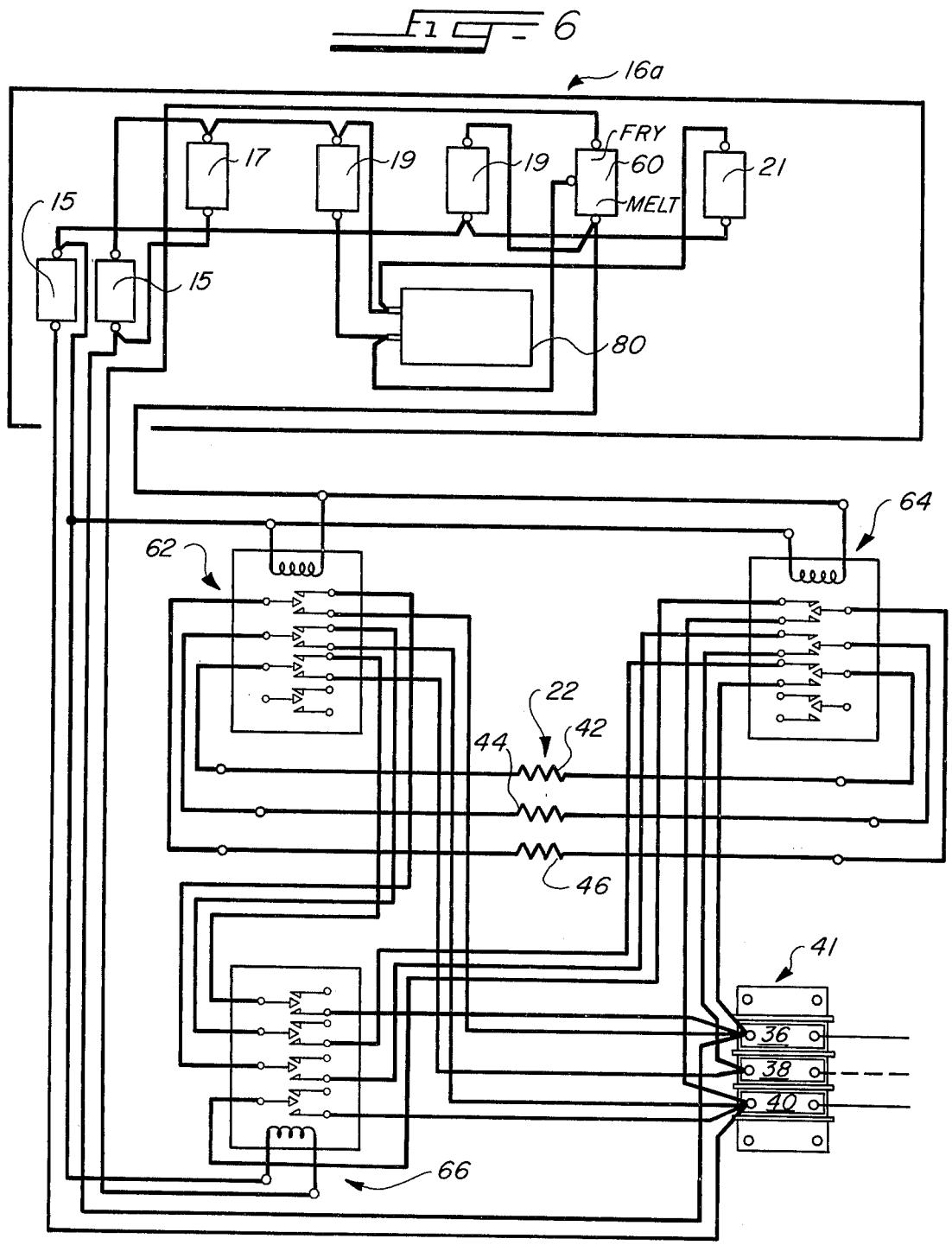

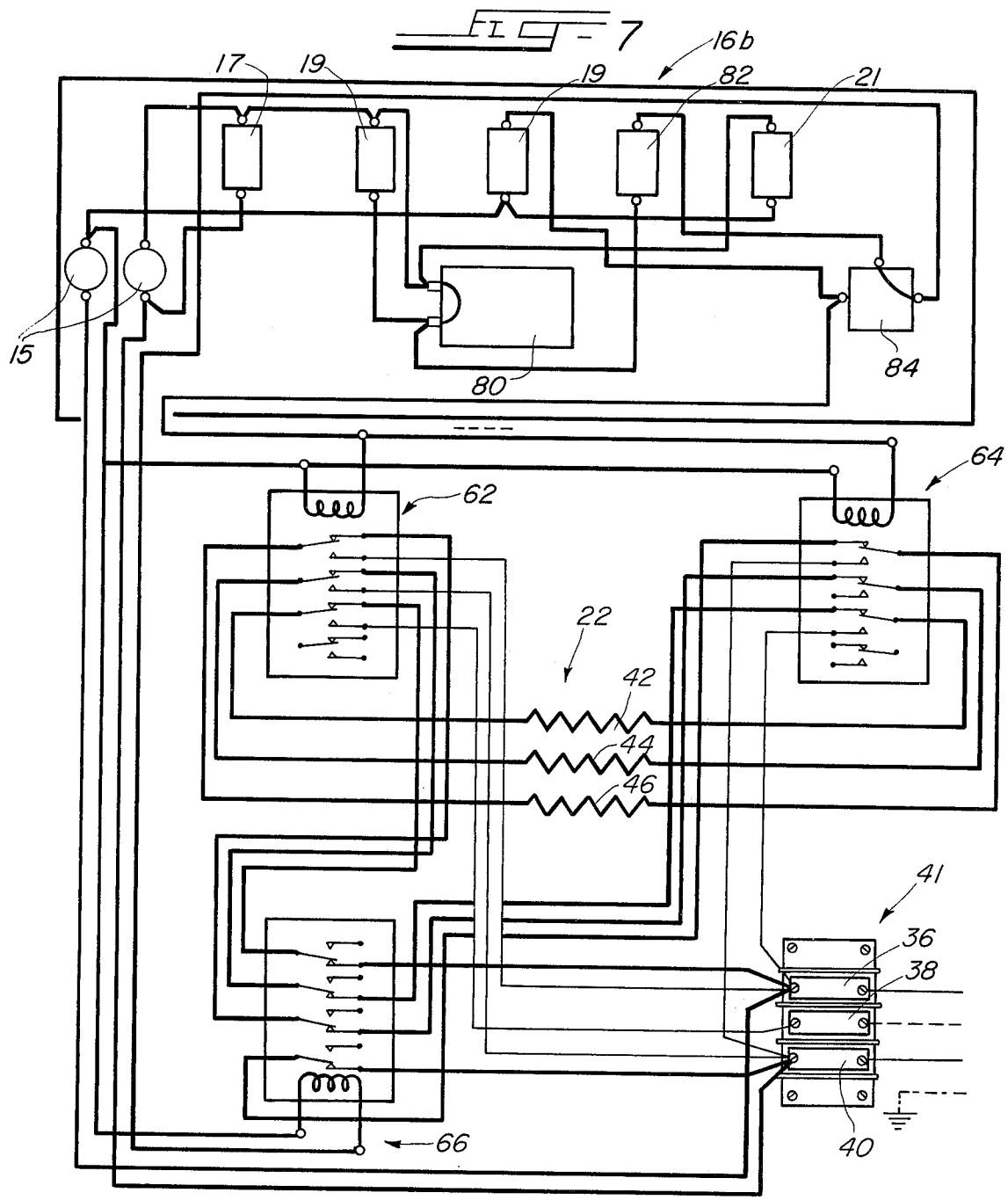

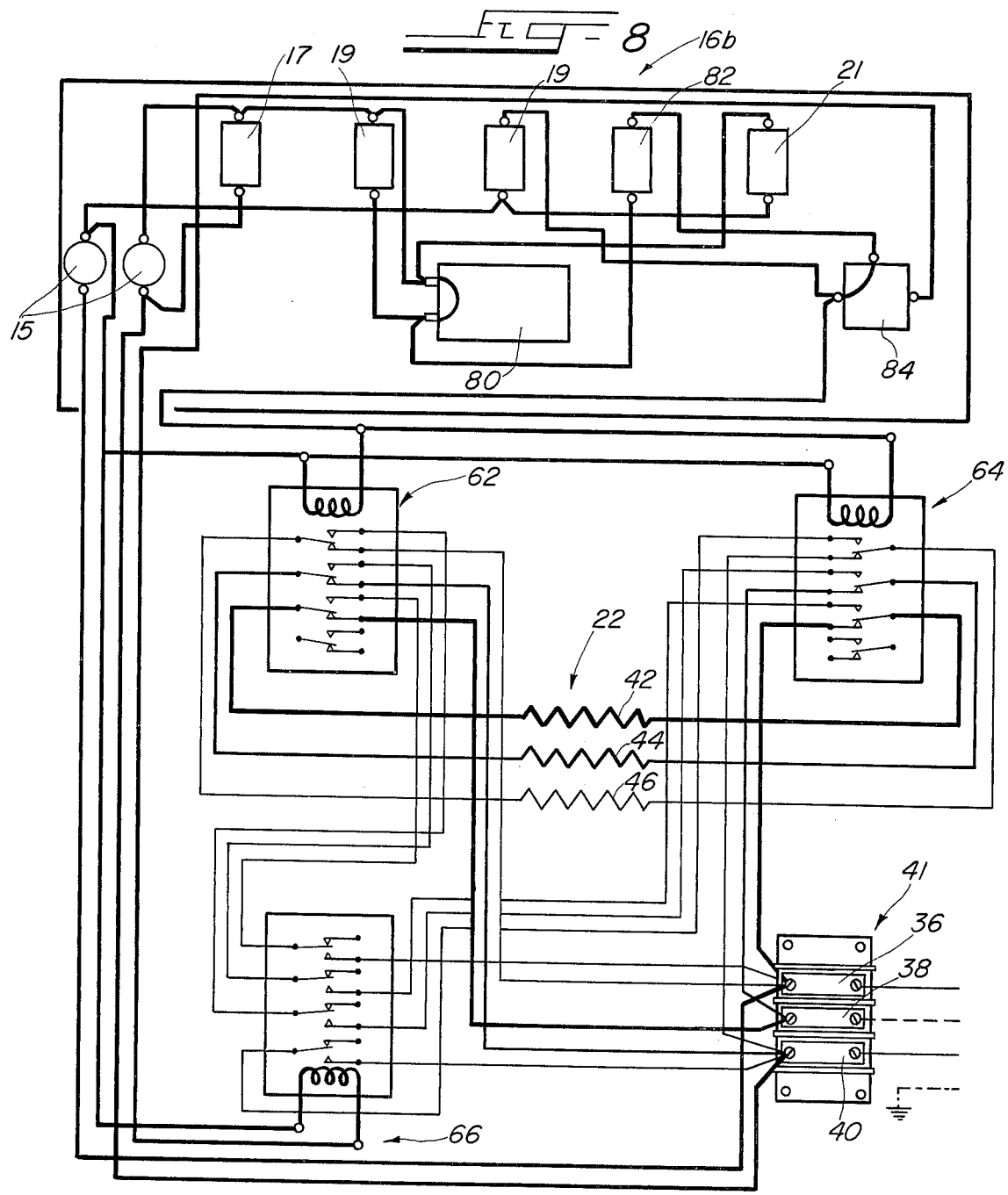

ELECTRIC DEEP FAT FRYER WITH CONTROLLED HEAT DURING START-UP

This is a continuation-in-part of application Ser. No. 420,100, filed Nov. 29, 1973, now abandoned.

BACKGROUND OF THE INVENTION

In the use of a deep fat fryer as a fat melter, start-up can pose a particularly knotty problem. If the full heat required to maintain the fat liquid at a set temperature for frying purposes is initially thrown on the cold solidified fat during start-up, the solidified fat can be burned in part and permanently damaged. It is necessary that if the fryer is to be used as a melter, something less than this full heat should be initially applied so as to melt the cold solidified fat at a low heat without burning. It is also expensive to duplicate electric heating elements in multi-circuit hookup requiring one set of heating elements in one electric circuit for start-up and another set of heating elements in another electric circuit for continuous operation as a fat fryer. There is thus an established need for an electric fat melting fryer having a single set of heating elements which can be selectively hooked up in series for a low heat rate for start-up followed by a manual or an automatic switch to a parallel hook-up at the high heat rate necessary to maintain the fat liquid at a set temperature suitable for frying operation when all the cold fat in the fryer is melted.

SUMMARY OF THE INVENTION

The gist of this invention lies in using an electric deep fat fryer as a low-heat fat melter by connecting the heating elements of the fryer in series circuit hookup during start-up and by switching the connection of these same heating elements over to parallel circuit hookup when all the fat in the fryer is melted and the fryer is on full power at a set fat temperature suitable for the frying operation.

The switchover of these same elements from series circuit hookup for melt operation to parallel circuit hookup for fry operation can be manually made or automatically actuated by a thermostatically controlled two-way switch which is normally closed at low temperature and which shifts to high heat connection when the temperature is reached indicating that all of the solidified fat has melted.

DESCRIPTION OF THE DRAWINGS

FIG. 6 shows the wiring diagram for one leg of the delta electrical hookup of the three sets of three heating elements equipped for manual switchover from series to parallel circuit;

FIG. 7 shows the wiring diagram for one leg of the delta electrical hookup of the three sets of three heating elements equipped for automatic switchover from series to parallel circuit in the series circuit hookup mode where a heavy line indicates a circuit for carrying the first phase current through series hookup of the heating elements and a control circuit and a light line an open circuit; and FIG. 8 shows the wiring diagram for one leg of the delta electrical hookup of the three sets of three heating elements equipped for automatic switchover from series to parallel circuit in the parallel circuit hookup mode where a heavy line indicates a circuit for carrying the first phase current through a first heating element, an intermediate line for carrying the second phase current through a second heating element, and a light line for carrying the third phase current through a third heating element.

DESCRIPTION OF THE PREFERRED EMBODIMENT

Figure 1:
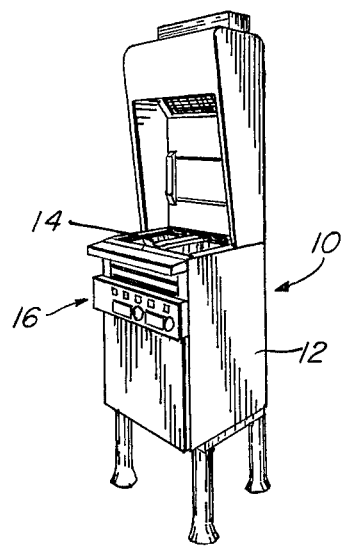
FIG. 1 shows a perspective view of a deep fat fryer used as a fat melter according to the teachings of this invention.
Figure 2:
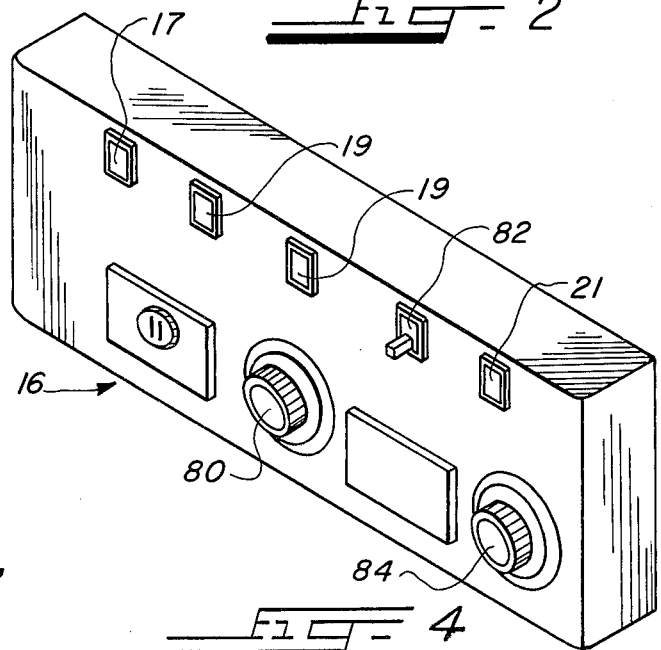
FIG. 2 shows a perspective view of the control panel for automatic switchover from low to high heat.
Figure 3:
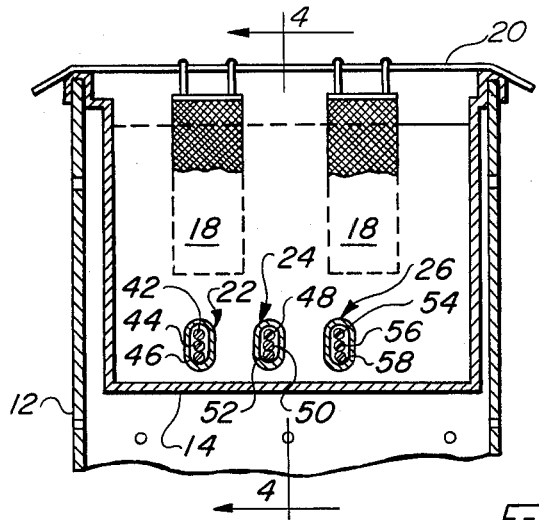
FIG. 3 shows a cross-section through the deep fat fryer along line 3—3 of FIG. 4 showing in cross-section the three sets of three heating elements in the fryer vessel.
Figure 4:
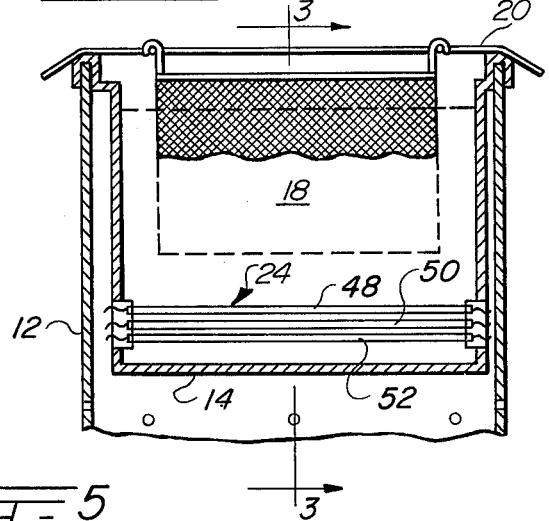
FIG. 4 shows a cross-section through the deep fat fryer along line 4—4 of FIG. 3 taken at right angles to FIG. 3 showing one set of three heating elements extending across the fryer vessel.

Reference is made to FIG. 1 showing the combination fat melter and deep fat fryer 10 which comprises an upstanding body 12 containing an open top fat fryer vessel 14, as shown in FIGS. 3 and 4. A control panel 16, such as shown in FIG. 2, is mounted to the front end of the fryer 10 and a red light 17, indicating lights 19 and a pilot light 21 are displayed on the face thereof. Baskets 18 for containing the food product to be fried in the fryer vessel 14 hang from a bar structure 20 supported on the upper edge of the wall of body 12, as shown in FIGS. 3 and 4.

Figure 5:
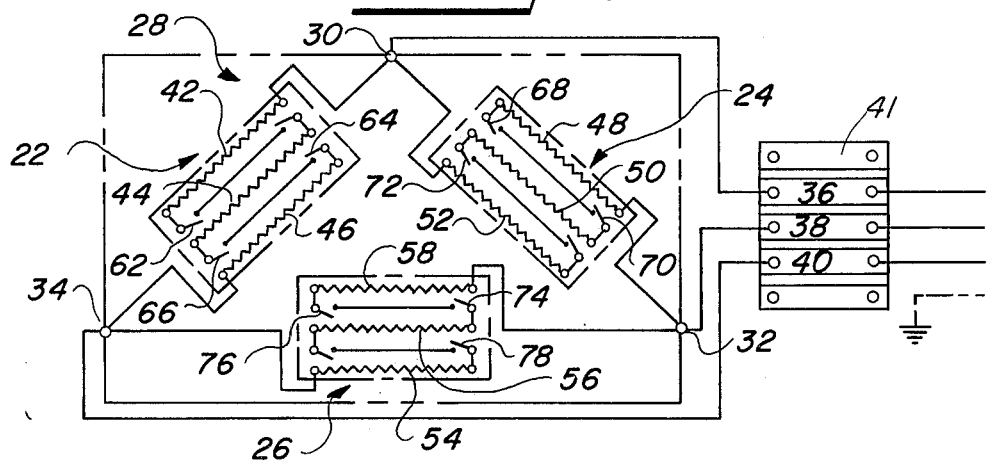
FIG. 5 shows a schematic of the delta electrical hookup of the three legs of three heating elements each and the switchgear for the switchover of each set of three heating elements from series circuit to parallel circuit hookup.

Heating element legs 22, 24 and 26 which traverse across and adjacent to the bottom of vessel 14 in side-by-side relation, as shown in FIGS. 3 and 4, are electrically connected in series or parallel hook-up 28, as shown in FIG. 5. In the parallel hook-up, heating elements 42, 44 and 46 of legs 22, 48, 50 and 52 of leg 24 and 54, 56 and 58 of leg 26 each connect in delta across a single phase of a 220 volt A.C. three-phase electrical power bus 36, 38 and 40 on terminal block 41. In the series hook-up, leg heating elements 42, 44 and 46 of leg 22, 48, 50 and 52 of leg 34 and 54, 56 and 58 of leg 26 each connect in series to a single phase of the power supply.

Individual heating elements 42, 44 and 46 in leg 22, 48, 50 and 52 in leg 24, and 54, 56 and 58 in leg 26 constitute the working parts of the legs 22, 24 and 26 of delta hook-up 28, as shown in FIGS. 3, 4 and 5.

Manual fry-melt switch 60 is mounted on manual switchover control panel 16a, as shown in FIG. 6, for manual switchover of each group of heating elements 42, 44 and 46; 48, 50 and 52; and 54, 56 and 58, respectively, from series circuit hook-up for melt operation to parallel circuit hook-up of the same for fry operation. Relay-actuated switch-blocks 62, 64 and 66 for leg 22 of delta hook-up 28, as shown in FIGS. 5 and 6, and 68, 70 and 72 for leg 24 of delta hook-up 28, and 74, 76 and 78 for leg 26 of delta hook-up 28, as shown in FIG. 5, are electrically connected to fry-melt switch 60 so that the switchover from series circuit heating element hook-up for the melt operation to parallel circuit hook-up for the fry operation is obtained simply by throwing switch 60 from the melt to the fry position as called out on the face of the control panel.

A main thermostat 80 having one terminal connected through a first fuse 15 to the bus 36 of terminal block 41, as shown in FIG. 6, is connected in the circuit with the fry-melt switch 60 and the relay-actuated switches 62, 64 and 66 so as to regulate the temperature of the fat in the fryer vessel 14 whether the fat melter 10 is functioning with the heating elements 42, 44 and 46 of group 22; 48, 50 and 52 of group 24; and 54, 56 and 58 of group 26, respectively, connected in series circuit melt hook-up, or the fryer 10 is on full power with each group of heating elements 42, 44 and 46; 48, 50 and 52; and 54, 56 and 58, respectively, connected in parallel circuit fry hook-up. With switch 60 set on "melt", the main thermostat 80 is closed and not regulating and both relay switches 62 and 64 are not actuated while switch 66 is. With switch 60 on "fry", switch 66 is not actuated and the thermostat 80 is regulating. Relay actuated switches 62, 64 and 66 connect through a second fuse 15 to the bus 38 of terminal block 41.

A normally-open automatic fry-melt switch 82 which is mounted on control panel 16B, as shown in FIGS. 7 and 8, automatically switches heating elements 42, 44 and 46, 48 50 and 52, and 54, 56 and 58, respectively, from series circuit hook-up for melt operation to parallel circuit hook-up of the same for fry operation. Normally-closed "up" relay-actuated switch-blocks 62, 64 and 66 for leg 22 alone, as shown in FIG. 7, are electrically connected for series circuit hook-up of the same for melt operation. Other legs 24 and 26 are similarly electrically connected for melt.

A switchover thermostat 84, which is "normally closed" at melt temperature, electrically connects to relay-actuated switch 66 for leg 22, as shown in FIG. 7, and also 72 for leg 24 (not shown), and 78 for leg 26 (not shown) so that until the temperature of the fat in the vessel 14 reaches a level indicating that all the solidified fat has entirely melted, the thermostat 84 remains normally closed and the heating elements 42, 44 and 46, 48, 50 and 52, and 54, 56 and 58 remain in series circuit hook-up for continued melt operation. With thermostat 84 in "melt" position, the main thermostat 80 is closed and not regulating and both relay switches 62 and 64 are not actuated while switch 66 is. Relay-actuated switches 62, 64 and 66 and the others connect through a second fuse 15 to bus 38 of relay terminal block 41.

When the temperature of the fat in the vessel 14 reaches a level indicating that the fat has entirely melted, the thermostat 84 switches to the opposite position energizing relay-actuated switch-blocks 62 and 64 in leg 22 to the closed "down" position while switch 66 reverts to normally-closed "up", as shown in FIG. 8, and also 68 and 70 for leg 24 (not shown), and 74 and 76 for leg 26 (not shown) so that after the temperature of the fat in the vessel 14 reaches a level indicating that all the solidified fat has entirely melted, the thermostat 84 connects up the heating elements 42, 44 and 46, 48, 50 and 52, and 54, 56 and 58 in parallel circuit hook-up for the fry operation. With thermostat 84 on "fry", switch 66 is not actuated and thermostat 80 is regulating.

When the fat has all melted and the circuit has automatically been switched over from "melt" to "fry" and the heating elements 42, 44 and 46, 48, 50 and 52, and 54, 56 and 58 are in parallel circuit for fry operation, as shown in FIG. 8, the switchover thermostat 84 is by-passed and the main thermostat 80 actuates relay switches 62 and 64 for regulating the fat frying temperature.

High limit thermostats or fuses 15 protect the whole system from overloading the power source.

The main advantage of this invention lies in the utilization of the same heating elements for low-heat and high-heat melt and fry requirements by simply electrically connecting said same elements in either series circuit or parallel circuit hook-up to give the low-heat input for start-up of the fryer as a fat melter or the high-heat for continuous operation as a fat fryer.

Although several embodiments of this invention have been herein shown and described, it will be understood that details of the construction shown may be altered or omitted without departing from the spirit of the invention as defined by the following claims.

I claim:

1. A fat-melting electric deep-fat fryer having low-high heating modes for fat melt and fat fry operations comprising an upstanding body having a receptacle opening to the top thereof; a control panel mounted on the fryer body; baskets for containing the food product to be fried hanging from means supported on the upper edge of the said receptacle; a power circuit comprising first, second and third heating elements traversing across and adjacent to the bottom of the receptacle in side-by-side relation and electrically connected to 220-volt A.C. three-phase electrical power supply mounted on a terminal block; a heating control circuit comprising two-way switch means mounted on the control panel for switchover of the heating elements of the power circuit from series circuit hook-up for the melt operation to parallel circuit hook-up of the same for fry operation; first, second and third relay-actuated switches for each of the first, second and third legs of the delta hook-up electrically connected to the said two-way switch means for switchover of the power circuit from series-circuit heating element hook-up for the fat melt operation to parallel circuit hook-up for the fat fry operation; and a main thermostat operatively connected in the circuit along with the two-way switch means between the power supply and the first, second and third relay-actuated switches for regulating the temperature of the fat in the fryer receptacle during fry operation.

2. A fat-melting electric deep-fat fryer having low and high heating modes for fat melt and fat fry operations comprising an upstanding body including a deep fat receptacle opening to the top of said body; a control panel mounted on the fryer body and having indicating lights displayed on the face thereof; baskets for containing the food product to be fried hanging from means supported on the upper edge of the receptacle; first, second and third heating elements comprising a heating power circuit traversing across and adjacent to the bottom of the vessel in side-by-side relation and electrically connected to 220-volt A.C. three-phase electrical power supply mounted on a terminal block; a heating control circuit comprising a thermostatic-controlled two-way switch mounted on the control panel for automatic switchover of heating elements of the power circuit from series circuit hook-up for melt operation to parallel circuit hook-up of the same for fry operation when all the fat in the fryer has melted; first, second and third relay-actuated switches for each of the first, second and third legs of the delta hook-up electrically connected to the thermostatic-controlled fry-melt two-way switch for automatic switchover of the power circuit from series-circuit heating element hook-up for the melt operation to parallel circuit hook-up for the fry operation when the temperature reaches a level indicating all the fat has melted, and a main thermostat operatively connected in the circuit along with the thermostatic-controlled two-way switch between the power supply and the first, second and third relay-actuated switches for regulating the temperature of the fat in the fryer receptacle during fry operation.

* * * * *